C. R. MANSFIELD.
ARTIFICIAL BAIT.
APPLICATION FILED DEC. 5, 1919.

1,351,669. Patented Aug. 31, 1920.

WITNESS:
E. R. Ruppert

INVENTOR.
BY C. R. Mansfield
Victor J. Evans
ATTORNEY.

UNITED STATES PATENT OFFICE.

CHARLES R. MANSFIELD, OF CRESCENT CITY, CALIFORNIA.

ARTIFICIAL BAIT.

1,351,669.  Specification of Letters Patent.  Patented Aug. 31, 1920.

Application filed December 5, 1919. Serial No. 342,702.

*To all whom it may concern:*

Be it known that I, CHARLES R. MANSFIELD, a citizen of the United States, residing at Crescent City, in the county of Del Norte and State of California, have invented new and useful Improvements in Artificial Bait, of which the following is a specification.

This invention relates to artificial bait, and comprises a body portion formed from a single strand of wire, and designed to accommodate the hooks and the plate utilized for attracting the fish, in a manner whereby these parts can be readily detached from the body portion and new parts substituted when the occasion requires.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein.

Figure 1:
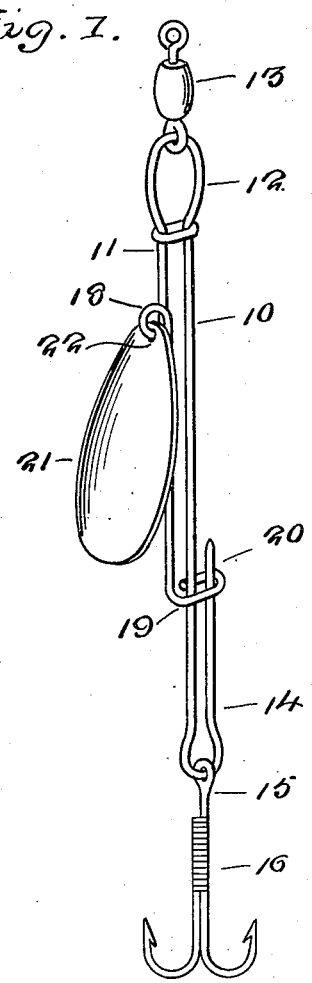
Figure 1 is a view of the bait showing the parts associated.
Figure 2:
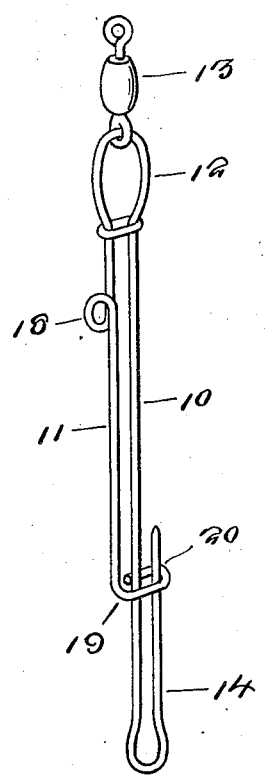
Fig. 2 is an elevation of the body portion of the bait with the plate and hooks removed.

In carrying out the invention I construct the body portion of the bait from a single strand of resilient wire, which is bent at a point approximately midway of its ends to provide the limbs 10 and 11 respectively. The limbs are connected adjacent one end of the body portion to define an eye 12 at one end of the body which provides for the connection between the body portion and the swivel 13. The limb 10 projects an appreciable distance below the free end of the limb 11, and is then bent upwardly as at 14 to provide a hook. The hook is adapted to be received within the eye 15 of the shank 16 of the hook. The limb 11 of the body portion at a point immediately beneath the connection 12 between said limbs is formed to provide an eye 18 arranged at right angles to the eye 12, the limb being contiguous in parallelism with the limb 10, having its lower or free end offset as at 19 and terminating in an open loop 20 adapted to embrace the hook like terminal of the limb 10 to hold the hook closed and to prevent casual separation of the hooks from the limb 10. The plate 21 is slightly concaved as shown and may be constructed of any suitable material and provided with the desired brilliancy to attract the fish, the plate 21 is provided with an opening 22 through which the limb 11 is threaded so as to position the plate in the eye 18, the concave side of the plate is arranged adjacent the body of the bait. The construction is such that the limbs 10 and 11 respectively can be readily separated to permit the hooks to be removed from the limb 10 for the plate 21 to be separated from the limb 11.

While I have shown and described what I consider the preferred embodiment of the invention, I desire to have it understood that I do not limit myself in this connection, in that such changes may be resorted to when desired as fall within the scope of what is claimed.

Having thus described my invention what I claim as new is:—

1. An artificial bait comprising a body portion formed from a single strand of wire and bent to provide an eye at one end of the body, and spaced limbs, one of said limbs terminating to provide a hook, an eye formed in the length of the other limb, and arranged at right angles to the aforementioned eye, the plate having an opening to receive said eye from which the plate is supported, and a laterally disposed open loop formed by the free ends of the second mentioned limb, said loop being adapted to embrace said hook to hold the latter closed.

2. An artificial bait comprising a body portion formed from a single strand of wire and bent to provide spaced parallel limbs of relatively different length, one of said limbs terminating to provide a hook, the other of said limbs being designed to embrace the longer limb and said hook and hold the said hook closed, and a plate loosely associated with said body portion.

3. An artificial bait comprising a body portion formed from a single strand of wire bent to provide spaced parallel limbs of relatively different length, the longer limb terminating to provide a hook, the shorter limb terminating to provide a loop embracing the longer limb and hook and holding said hook closed, and a plate loosely carried by said body portion.

4. An artificial bait comprising a body portion formed from a single strand of wire and bent to provide spaced parallel limbs of relatively different length, one of said limbs terminating to provide a hook disposed at the side of said limb most remote from the other of said limbs, the latter mentioned limb terminating to provide a loop embracing the longer limb and said hook for holding the latter closed.

In testimony whereof I affix my signature.

CHARLES R. MANSFIELD.